(12) United States Patent
Terry

(10) Patent No.: US 6,940,466 B2
(45) Date of Patent: Sep. 6, 2005

(54) ENHANCED MAGNETIC FIELD COMMUNICATION SYSTEM

(75) Inventor: John David Terry, Santa Rosa, CA (US)

(73) Assignees: Starkey Laboratories, Inc., Eden Prairie, MN (US); Oticon A/S, Hellerup (DK)

( * ) Notice: Subject to any disclaimer, the term of this patent is extended or adjusted under 35 U.S.C. 154(b) by 7 days.

(21) Appl. No.: 10/722,093

(22) Filed: Nov. 25, 2003

(65) Prior Publication Data

US 2005/0110700 A1 May 26, 2005

(51) Int. Cl.$^7$ .............................. H01Q 1/52; H04B 1/16
(52) U.S. Cl. ........................ 343/841; 343/860; 455/341
(58) Field of Search ................................ 343/841, 860, 343/713, 895, 701; 455/341, 274, 82, 87; H01Q 1/52; H04B 1/16

(56) References Cited

U.S. PATENT DOCUMENTS

| | | | |
|---|---|---|---|
| 4,638,253 A | | 1/1987 | Jaskolski et al. |
| 5,296,866 A | * | 3/1994 | Sutton ......................... 343/701 |
| 5,757,288 A | * | 5/1998 | Dixon et al. ................. 340/941 |
| 6,606,489 B2 | * | 8/2003 | Razavi et al. ............... 455/323 |
| 6,636,116 B2 | * | 10/2003 | Cameron .................... 330/260 |

FOREIGN PATENT DOCUMENTS

| | | |
|---|---|---|
| EP | 0700169 A2 | 3/1996 |
| WO | WO-01/67413 A1 | 9/2001 |

OTHER PUBLICATIONS

"International Search Report for corresponding PCT Application No. PCT/US2004/039608", (Apr. 15, 2005), 3 pgs.

* cited by examiner

*Primary Examiner*—Trinh Vo Dinh
(74) *Attorney, Agent, or Firm*—Schwegman, Lundberg, Woessner & Kluth, P.A.

(57) ABSTRACT

Devices and methods are provided to enhance magnetic field communication. One aspect of the present subject matter relates to a method for transmitting and receiving signals using an antenna element electrically connected to a driver and an amplifier. According to various embodiments of the method, a first signal is transmitted from the antenna element and a second signal that was induced in the antenna element is received. Transmitting the first signal includes driving the first signal through the antenna element using the driver, and monitoring the first signal through an input impedance of the amplifier. Receiving the second signal includes reducing the input impedance of the amplifier, and receiving the second signal at the amplifier through the reduced input impedance. Various embodiments shield the antenna element from electric and electromagnetic fields. Other aspects are provided herein.

19 Claims, 5 Drawing Sheets

ENHANCED MAGNETIC FIELD COMMUNICATION SYSTEM

TECHNICAL FIELD

This application relates generally to communication systems, and, more particularly, to systems, devices and methods to receive and transmit magnetic field communication signals.

BACKGROUND

The dominant mode of signal propagation in some known communications systems that have relatively large distances between the receiving and transmitting antennas is electromagnetic fields. Due to their ability to travel relatively long distances, noise attributed to electromagnetic fields can be a significant problem. Known communication antenna designs attempt to optimize the pickup of electromagnetic, electric and magnetic fields, but few attempts are made to reduce the affects of propagated and conducted electromagnetic noise, propagated and conducted electric field noise, and propagated and conducted magnetic field noise.

For short-range communication applications, the antenna must have good near field performance and should reject unwanted signals and/or noise from unwanted radiating and conducting sources. Examples of such short-range communication applications include, but are not limited to, hearing aid to telephone receiver communications, hearing aid to hearing aid communications, and programmer to hearing aid communications. Examples of unwanted radiating sources include radio and television stations, and the like. Examples of unintentional radiating sources of unwanted electromagnetic interference (EMI) include computers, televisions, electric motors and the like. Examples of conducted interference sources are electric field and electromagnetic radiation conducted via electrically conductive objects such as metal, human skin and conductive liquids significantly impairing communications.

There are other design challenges facing short range communications systems. Virtually all short-range communication systems are compact, battery or RF powered and low-cost. Because of the previous requirements, most all short range communication systems are half-duplex or simplex communication systems that are capable of transmitting data in only one direction at a time. Known half-duplex or simplex communications system use electrical or mechanical switches to change between receive and transmit modes. These switches require a significant amount of time to switch between modes. Other problems include the additional parts and separate control lines to select between the receive and transmit modes.

The communication system is tuned to transmit and receive communication signals at a desired resonant frequency. However, the equivalent parallel parasitic capacitance of the coil and the capacitance of the low noise amplifier and other portions of the circuit can detrimentally and unpredictably affect the resonant frequency of the communication system.

There is a need in the art to provide improved communication systems and methods for transmitting and receiving short range data.

SUMMARY

The above-mentioned problems are addressed by the present subject matter and will be understood by reading and studying the following specification. Various aspects and embodiments of the present subject matter provide low noise amplifier and antenna designs that enhance magnetic field communications and minimize interference. Embodiments of the present subject matter have a number of advantages, including but not limited to: reducing common mode EMI pickup by using a differentially-driven receiver circuit; eliminating the control line to switch between transmit and receive modes; providing an adjustable communication bandwidth for the antenna; diminishing DC offset bias issues, reducing the RF voltages presented to the receive and transmit circuits; reducing the time to switch between transmitting and receiving modes; providing an integrated electrostatic shielding for the antenna; providing at least two selectable RF power levels; and reducing the effect of parasitic capacitance on the resonant frequency of the communication system.

One aspect of the present subject matter relates to a communication circuit to receive and transmit signals. According to various embodiments, the circuit includes an antenna element and an electrostatic conductor. The antenna element has a first terminal and a second terminal. The electrostatic conductor is positioned to shield the antenna element from electric fields. The antenna element is adapted to induce a received signal at the first and second terminals when the antenna element is in a magnetic field. The circuit also includes a driver, a differential amplifier and a switch. The driver is connected to at least one of the first and second terminals to energize the antenna element with a transmitted signal. The differential amplifier has a first input connected to the first terminal of the antenna element and a second input connected to the second terminal of the antenna element. The differential amplifier has a selectable input impedance. A lower first input impedance is selected to amplify the received signal from the antenna element, and a higher second input impedance is selected to monitor the transmitted signal from the driver to provide the ability to perform self alignment and self diagnostic processes on the communication circuit. The switch toggles an effective input impedance for the differential amplifier between the second impedance and the first impedance.

According to various embodiments, the circuit includes an antenna element, an amplifier circuit, a driver circuit and a control line. The antenna element includes a first and a second terminal, an inductive coil electrically connected to the first and the second terminals, and an electrostatic conductor to shield the inductive coil against electric fields. The amplifier circuit is adapted to amplify a magnetically-induced signal received by the antenna element. The amplifier circuit includes a differential amplifier, a first input impedance, a second input impedance, a predetermined feedback impedance and an impedance shunt. The differential amplifier includes a first input, a second input and an output. The first input impedance is connected between the first input of the amplifier and the first terminal of the antenna element. The second input impedance is connected between the second input of the amplifier and the second terminal of the antenna element. Each of the first input impedance and the second input impedance includes a first element and a second element. The predetermined feedback impedance is connected between the output and at least one of the two inputs of the differential amplifier. The input impedance shunt is connected across the second element for each of the two inputs of the differential amplifier. The driver circuit is adapted to drive the antenna element with a transmission signal. The control line is connected to the input impedance shunt to selectively shunt the second element for each of the two inputs of the amplifier. The control line is used to selectively reduce an effective input impedance to the differential amplifier to receive the magnetically-induced signal received by the antenna element.

One aspect of the present subject matter relates to a method for transmitting and receiving signals using an antenna element electrically connected to a driver and an amplifier. According to various embodiments of the method, a first signal is transmitted from the antenna element and a second signal that was induced in the antenna element is received. Transmitting the first signal includes driving the first signal through the antenna element using the driver, and monitoring the first signal through an input impedance of the amplifier. Receiving the second signal includes reducing the input impedance of the amplifier, and receiving the second signal at the amplifier through the reduced input impedance.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to be taken in a limiting sense. The scope of the present invention is defined by the appended claims and their equivalents.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope of the present subject matter is defined only by the appended claims, along with the full scope of legal equivalents to which such claims are entitled.

Figure 1:
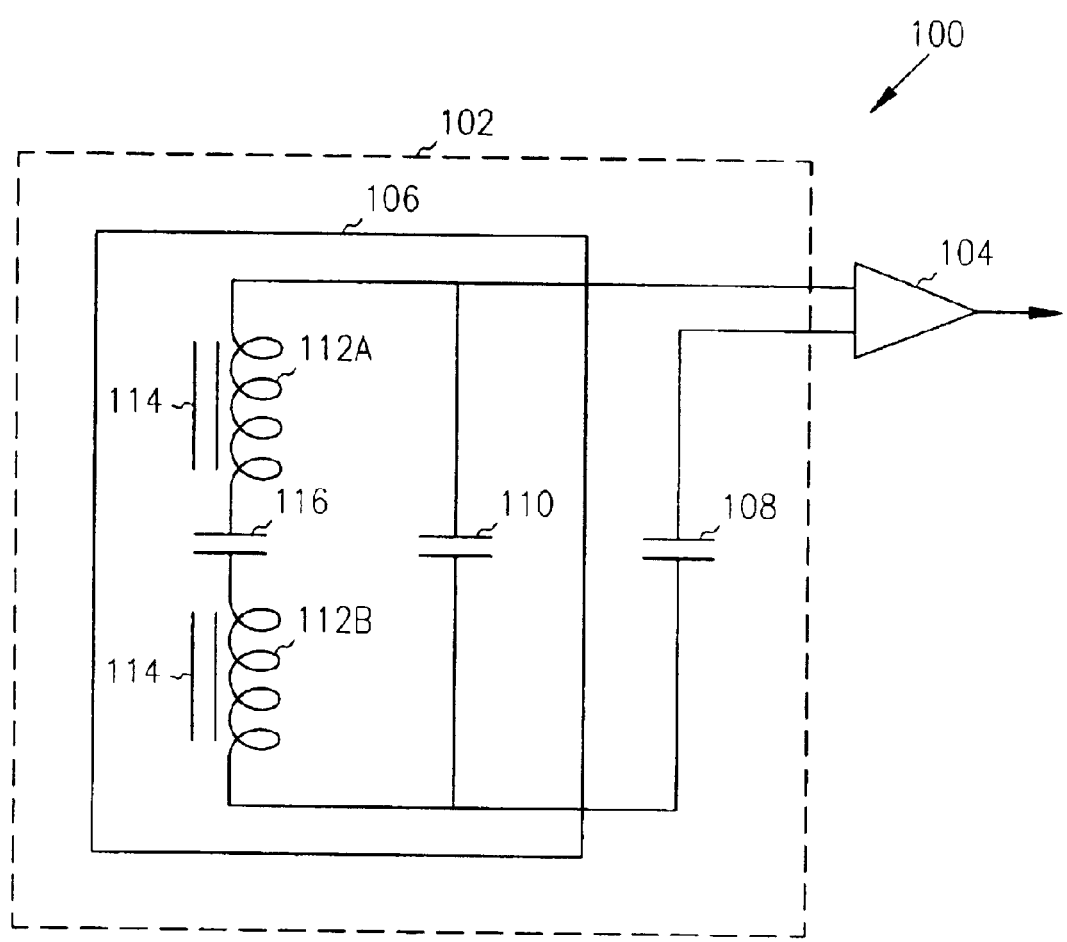
FIG. 1 illustrates a resonant circuit for an antenna element according to various embodiments of the present subject matter.

FIG. 1 illustrates a resonant circuit for an antenna element according to various embodiments of the present subject matter. The illustrated circuit 100 includes an antenna element 102 and a low noise amplifier 104. The antenna element 102 includes an inductive coil 106 connected in series with a tuning capacitor 108. The inductive coil 106 is illustrated with its equivalent parallel parasitic capacitance 110 and two coil portions 112A and 112B. As discussed below, the inductive coil has an electric field shield 114. The capacitive nature of this shield 114 contributes to the parasitic capacitance of the circuit. In various embodiments of the present subject matter, an additional capacitor 116 is connected in series with the coil 112A and 112B. This additional capacitor 116 makes the resonant circuit less susceptible to parasitic capacitance of the resonant circuit, and allows a large tuning capacitor to 108 be used to provide the circuit with a desired resonant frequency. A node where the capacitor connects to the coil is a high impedance node. In receive mode, this high impedance node is particularly susceptible to picking up electric field radiation, and in transmit mode it generates unacceptable high standing voltage, possibly damaging other near by circuits.

Figure 2:
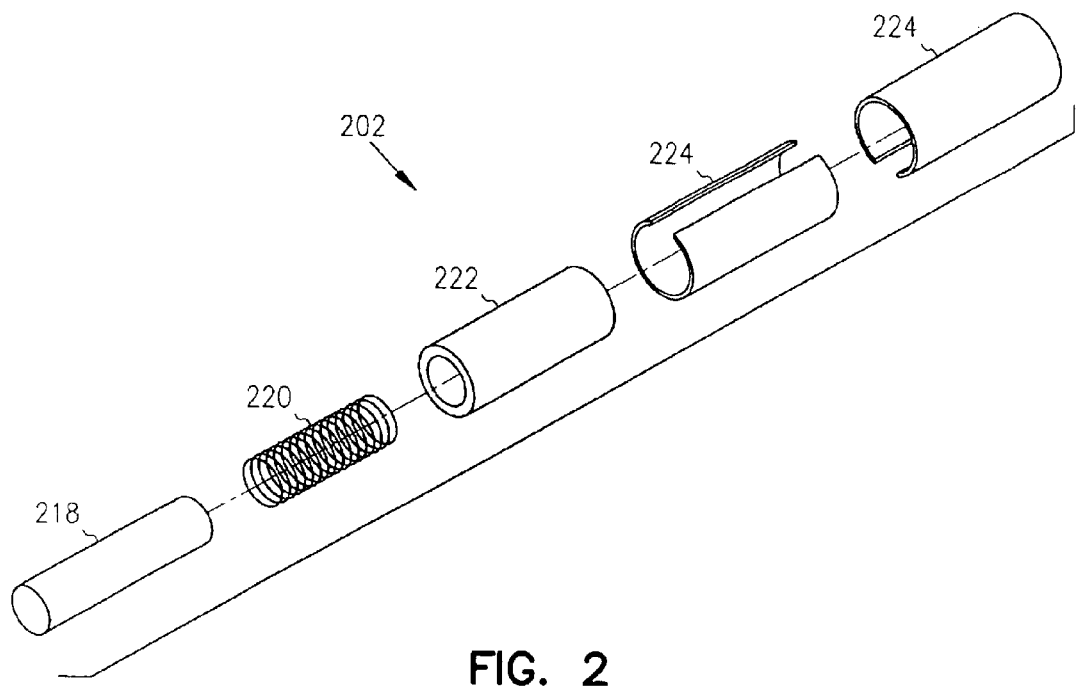
FIG. 2 illustrates a coil for an antenna element according to various embodiments of the present subject matter.

FIG. 2 illustrates a coil for an antenna element according to various embodiments of the present subject matter. The illustrated coil 202 includes a core 218 having a high magnetic permeability surrounded by coiled wire 220. Various embodiments include a ferrite core 218. In the illustration, the coiled wire is covered by an insulator 222, which is covered by an electrostatic conductor 224. One example of an electrostatic conductor is copper. The figure illustrates copper tape wrapped around the insulator. The copper tape functions as an electric field shield. In the presence of an electric field, the electric field shield collects a surface charge generated by the electric field.

In various embodiments such as illustrated in FIG. 1, the coiled wire 220 is split into a first portion 112A and a second portion 112B. The additional capacitor 116 is connected in series between the first portion and the second portion of the coil such that the additional capacitor, the first and second portions of the coil, and the nodes between the capacitor and the first and second portions of the coil are shielded from electric fields by the electrostatic conductor.

Figure 3:
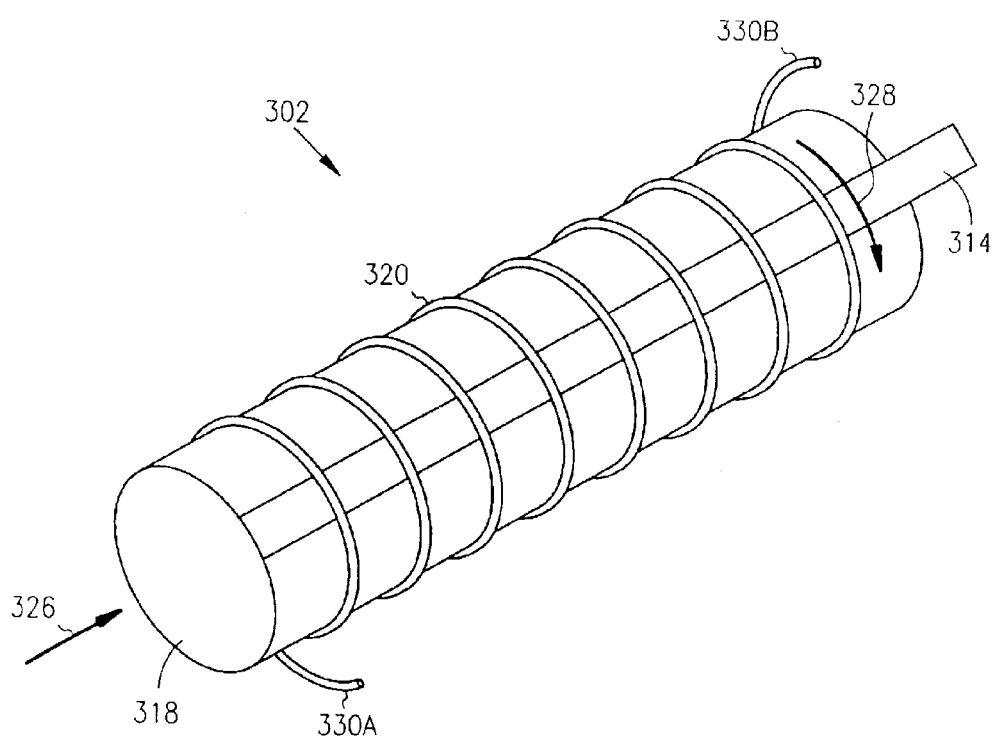
FIG. 3 illustrates an antenna element according to various embodiments of the present subject matter.

FIG. 3 illustrates an antenna element 302 according to various embodiments of the present subject matter. In the illustration, a wire conductor 320 is coiled around a core 318 having a high magnetic permeability and high electrical resistivity. In various embodiments, the core includes ferrite. In various embodiments, the core material includes air. Other embodiments include other core materials. As generally shown in the figure, a received magnetic field signal 326 induces a current signal 328 in the coil 320 and a transmitted current signal 328 in the coil 320 induces a magnetic field signal 326. The illustrated antenna element 302 has an electrostatic conductor 314 electrically insulated from the coil 320. In the presence of an electric field, the electrostatic conductor collects a surface charge generated by electric field. Thus, the electrostatic conductor functions as a shield against electric fields. In various embodiments, the electrostatic conductor is formed as a strip that extends across the length of the coil, as shown in FIG. 3. In various embodiments, the electrostatic conductor is formed as a cylindrical enclosure, such as shown in FIG. 2, for example.

In various embodiments, the electric field shield conductor 314 is left floating. Electrostatic surface charge collects on the conductor. Because like electrical charges naturally repel from each other, the electrostatic surface charges are distributed across the conductor. Thus, when the electrostatic conductor is left floating, the voltage attributable to the electric fields is uniformly (or approximately equally)

applied to each terminal 330A and 330B of the coil 320. As will be described in more detail below, the equal noise signal at each terminal of the coil is rejected as common mode noise by a low noise differential amplifier.

In various embodiments, the electric field shield conductor 314 is grounded or otherwise connected to a reference voltage such that the surface charges attributed to the electric fields are removed from the electrostatic conductor. Thus, neither one of the coil terminals 330A and 330B is significantly affected by a voltage on the electrostatic conductor.

The signal induced in the coil is received and amplified by a low noise amplifier. In the above-described embodiments, the electric fields do not significantly contribute to the amplified signal. The electrostatic conductor, in combination with a differential amplifier in various embodiments, rejects unwanted electric field signals and/or noise. Therefore, the amplified signal is attributable to the magnetic fields at the antenna element. The circuitry of the present subject matter rejects electric field signals which can travel relatively long distances, and can be a source of interfering noise. Thus, the present subject matter provides good short-range communication using only magnetic field signals.

Figure 4:
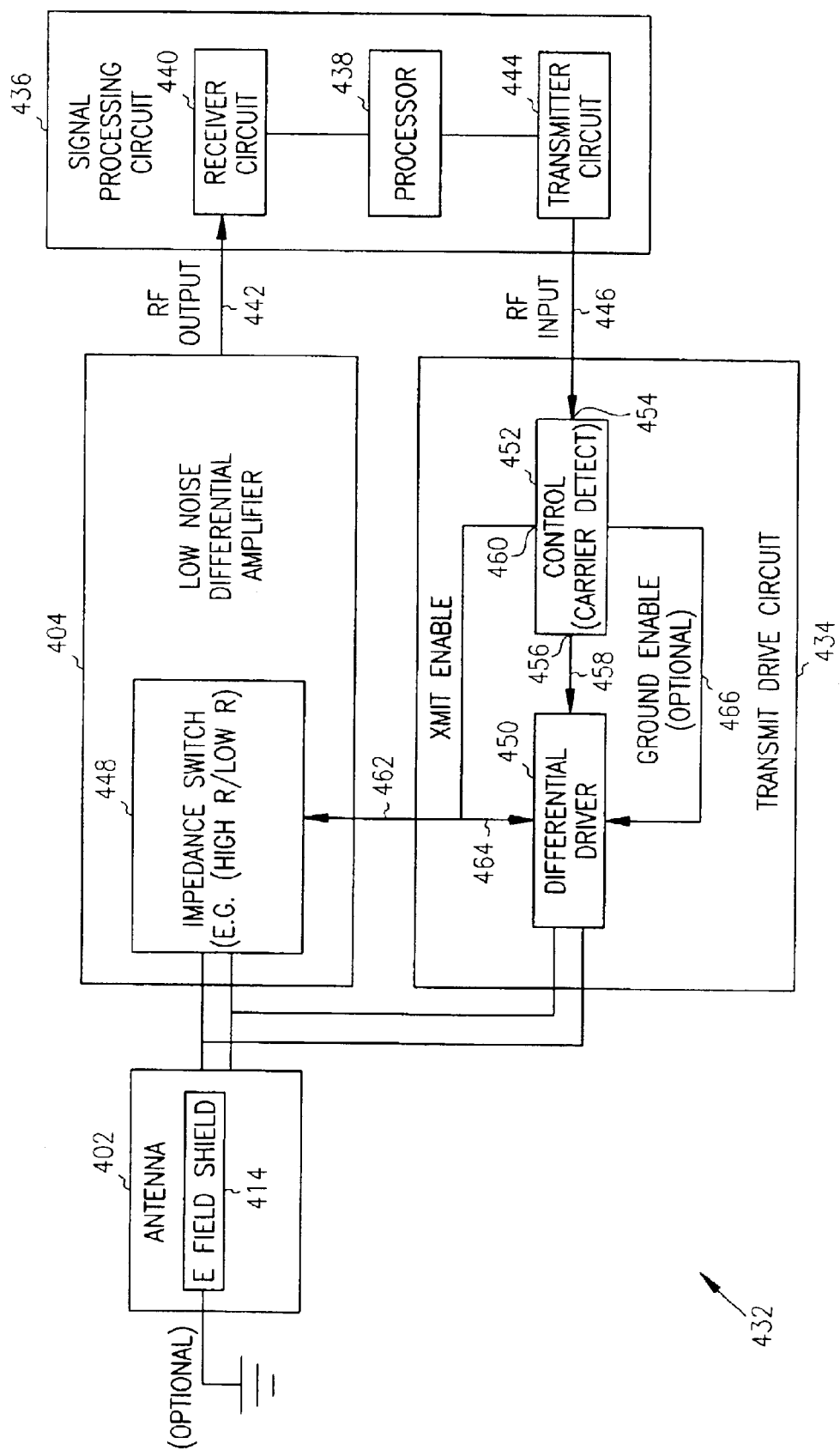
FIG. 4 illustrates a block diagram of a communication circuit to receive and transmit signals, according to various embodiments of the present subject matter.
Figure 5:
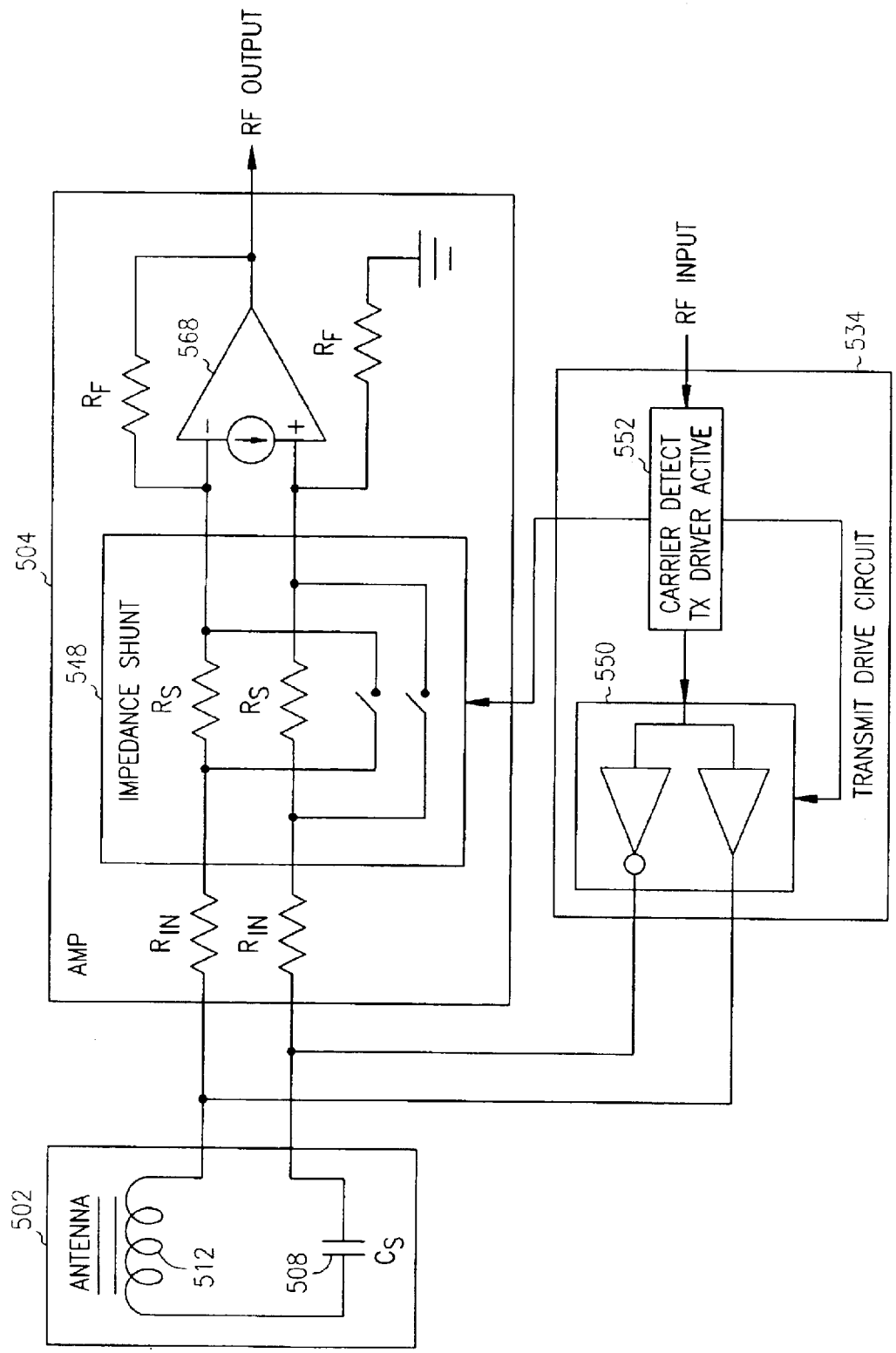
FIG. 5 illustrates a block diagram of a communication circuit to receive and transmit signals, according to various embodiments of the present subject matter.
Figure 6:
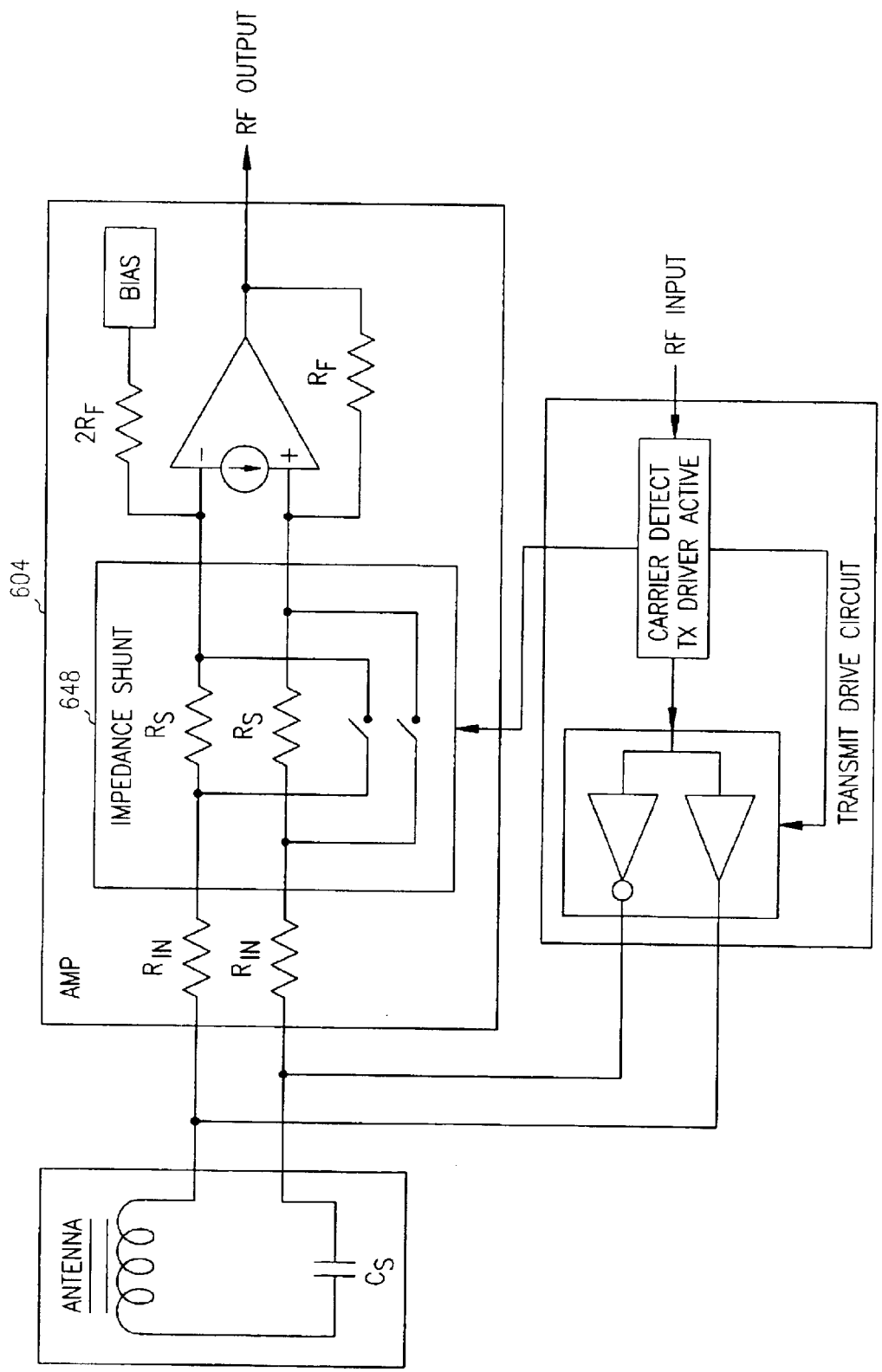
FIG. 6 illustrates a block diagram of a communication circuit to receive and transmit signals, according to various embodiments of the present subject matter.

FIG. 4 illustrates a block diagram of a communication circuit to receive and transmit signals, according to various embodiments of the present subject matter. FIGS. 5 and 6 may be useful to assist with the discussion of FIG. 4. The illustrated communication circuit 432 includes an antenna element 402, an amplifier circuit 404, and a transmit drive circuit 434. The figure also illustrates signal processing circuit 436. The signal processing circuit 436 includes a processor 438 to communicate with a receiver circuit 440 to receive an RF output signal 442 from the low noise differential amplifier 404 that is representative of a received signal at the antenna element 402. The processor 438 also communicates with a transmitter circuit 444 to send an RF input signal 446 to the transmit drive circuit 434, which in turn energizes the antenna element 404 with a signal representative of the RF input signal 446.

The transmit drive circuit 434 functions to energize the antenna element 402 with a signal for transmission at a resonant frequency. The amplifier circuit 404 functions to amplify a signal in preparation for further signal processing of the signal. The amplifier circuit 404 is able to receive and amplify a magnetically induced signal received by the antenna element at a resonant frequency. Additionally, in various embodiments, the amplifier circuit 404 is able to receive and amplify an energizing signal transmitted by the transmit drive circuit 434 to the antenna element 402 such that the energizing signal can be monitored and allow self-alignment, tuning optimization, channel selection and self diagnostics. The antenna element 402, the transmit drive circuit 434, and the amplifier circuit 404 are discussed in more detail below.

In various embodiments, the antenna element 402 includes an inductive coil in series with a capacitor. The antenna element is most efficient when the antenna elements resonant frequency coincide with the desired communication frequency. The antenna element's resonant frequency is influenced by the inductance and capacitance of the antenna. Parasitic capacitance in the circuit also can influence the resonant frequency. The received magnetic field induces a current in the inductive coil and is forwarded to the low noise differential amplifier.

The illustrated antenna element 402 includes an electric field shield 414. In various embodiments, an electrostatic conductor functions as a shield for electric fields. The electrostatic conductor is insulated from windings of the coil, and thus does not shunt the magnetic field. As discussed above, the electrostatic conductor conducts electrostatic surface charge attributed to electric fields. In various embodiments, the electrostatic conductor is connected to a reference potential (e.g. ground) such that the electrostatic energy is conducted away from the system antenna such that the electric field does not significantly influence the signal induced in the coil. In these embodiments, the amplifier 404 need not be a differential amplifier since the electrostatic energy is removed. In various embodiments, the electrostatic conductor floats (the conductor is not connected to a reference potential), and thus functions as an electrostatic equalizer. When the electrostatic conductor functions as an electrostatic equalizer, the surface charge attributed to electric fields is evenly distributed throughout the electrostatic conductor such that each terminal of the coil is equally affected by the electrostatic charge. The terminals of the coil are connected to a differential amplifier 404. The differential input of the amplifier rejects the common mode voltage, including voltage contributed by the electrostatic charge distributed across the electrostatic conductor.

In various embodiments, the amplifier 404 is a low noise differential amplifier. Various embodiments of the present subject matter include a low noise voltage-driven operational amplifier, and various embodiments include a low noise current-driven operational amplifier. Voltage-driven operational amplifiers and current-driven operational amplifiers are known to those skilled in the art. The band-pass response of the antenna circuit, and the amplifier's sensitivity to unwanted electric fields are capable of being modified by adjusting an impedance in the amplifier 404. The illustrated low noise differential amplifier includes an impedance switch 448, which is used to adjust an impedance of the amplifier 404 to receive a signal induced in the antenna element 402 by a magnetic field. In various embodiments, for example, the impedance switch 448 toggles an effective input impedance of the amplifier between a larger resistance and a smaller resistance.

There are number of ways to adjust the impedance of the amplifier to achieve a desired band-pass response and gain. Various embodiments of the amplifier include various arrangements of various elements that function as input and feedback impedances. Additionally, various embodiments implement an impedance switch with these various elements and configurations to adjust the band-pass response and/or gain of the amplifier as desired by actuating the switch.

In various embodiments, the input impedance of each input to the differential amplifier 404 includes a first element connected in series with a second element. The impedance switch includes a transistor that, when actuated, forms a shunt across the second element to change the effective input impedance. Thus, in embodiments where the first and second elements are in series and the second element is selectively shunted, a lower first input impedance (first impedance) is formed by the first element and a lower second input impedance (second impedance) is formed by a combination of the first element (first impedance) and the second element (third impedance). In various embodiments, the input impedance of each input to the differential amplifier includes a first element connected in parallel with a second element. The impedance switch includes a transistor that, when actuated, forms a shunt across the second element to change the effective input impedance. Other switchable impedance networks fall within the scope of the present subject, regardless of whether the switchable impedance network provides an adjustable input impedance or an adjustable feedback impedance, or whether the switchable impedance network switches between distinct high impedance and low impedance paths for the input impedance and/or the feedback impedance.

The transmit drive circuit 434 includes a transmitter driver 450, and control circuitry 452 to control the input impedance of the amplifier and to enable the transmitter driver based on whether a carrier signal is detected. The illustrated control circuitry includes one RF input 454 to receive an RF input signal 446, and one RF output 456 to transmit a corresponding RF signal 458 to the driver. At least one control output 460 is used to control the impedance switch to appropriately control the impedance of the amplifier, and to enable the transmitter drive stage via a transmit (XMIT) enable signal.

In various embodiments, when the RF input 454 has a carrier of adequate RF drive level, the control circuitry 452 triggers at least one output 460 to raise the effective input impedance of the receiver amplifier via line 462 and to enable the transmitter via line 464. When the illustrated circuit is in a transmit mode, the higher effective input impedance attenuates the input signal allowing the receiver amplifier to monitor the transmission drive signal at the antenna element allowing self alignment of the circuit. The receiver input attenuation avoids excessive circuit loading when the transmit signal is received. Thus, with a larger receiver input impedance, the transmitter driver is able to more efficiently drive the antenna element, and the amplifier is protected from higher voltages provided by the transmitter driver. The driver circuit is capable of being monitored by the receiver circuitry through the larger impedance. When the RF input does not have a carrier of adequate RF drive level, the illustrated circuitry is in a receive mode, and the control circuitry triggers the at least one output to lower the effective input attenuation of the receiver path and disables the transmitter via line 464. The lower effective receiver attenuation enhances the efficiency of the antenna element to receive magnetic signals and provide a corresponding signal to the amplifier. When the illustrated circuitry is in a receive mode, the disabled transmitter is in a high impedance mode (e.g. open circuit) to avoid loading the antenna element when it is receiving the magnetically-transmitted signals.

In various embodiments, the transmitter drive circuit 450 includes a differential push-pull driver stage. When enabled, the driver stage converts the transmit information into a differential output with low output impedance at antenna resonant frequency providing maximum drive current to the antenna element. In various embodiments, supply power savings is achieved by disabling one of the output stages by using a ground enable control signal 466. In various embodiments, the control circuitry or carrier detect circuitry triggers an output to provide the ground enable control signal. Disabling one of the output stages allows the RF device level to be lowered by 6 dB.

FIG. 5 illustrates a block diagram of a communication circuit to receive and transmit signals, according to various embodiments of the present subject matter. In accordance with various embodiments of the present subject matter, the illustrated block diagram provides further detail to the block diagram of FIG. 4. The illustrated antenna element 502 includes a coil 512 and a tuning capacitor 508 in series with the coil 512. The illustrated transmitter drive circuit 534 includes a push-pull drive stage 550 and a control circuit 552 to control various operations of the circuit based on detecting an RF carrier signal.

The illustrated amplifier 504 includes a voltage-driven amplifier 568. The voltage-driven operational amplifier has a very high input impedance. One of ordinary skill in the art will appreciate that the input ($R_{IN}$ and $R_S$) and feedback ($R_F$) resistors set the amplifier gain and the input impedance of the amplifier. The band-pass response of the antenna circuit, and the amplifier's sensitivity to unwanted electric fields are capable of being modified by adjusting the input impedance and/or the feedback impedance of the voltage-driven operational amplifier. Input and feedback elements are appropriately selected to function with a switch to appropriately adjust the band-pass response and/or gain of the amplifier.

In various embodiments, the effective input impedance to the voltage-driven amp is adjustable. In the illustrated figure, the input impedance network includes, for each input of the differential amplifier 568, a first element or input resistor ($R_{IN}$) connected in series with a second element or shuntable resistor ($R_s$). An impedance shunt 548 is formed across the shuntable resistors ($R_S$) such that the shuntable resistors ($R_S$) can be removed from the effective input impedance of the amplifier. Other impedance elements can be substituted to provide a desired switch-actuated adjustment to the band-pass and gain. In various embodiments, the switches are formed by a transistor, such as a FET transistor, coupled in parallel across the shuntable resistors ($R_S$) with their gates operably connected to a control line from the carrier detect control circuitry. An effective short is provided by providing a potential to the gate to turn on the transistor. This is illustrated in the figures as a logic switches. When an RF carrier signal is detected, the carrier detect con trol circuitry opens the shunt (e.g. turns off the transistor) such that the effective input impedance is larger to increase the energizing current to the antenna element. The larger effective input resistance includes both $R_{IN}$ and $R_S$ for each input of the differential amplifier. When an RF carrier signal is not detected, the carrier detect control circuitry closes the shunt (e.g. turns on the transistor) such that the effective input impedance is smaller to increase the amplification of the magnetic field induced current received by the antenna element. The smaller effective input resistance includes $R_{IN}$ and excludes $R_s$ for each input of the differential amplifier.

FIG. 6 illustrates a block diagram of a communication circuit to receive and transmit signals, according to various embodiments of the present subject matter. In accordance with various embodiments of the present subject matter, the illustrated bock diagram provides further details to the block diagram of FIG. 4. The illustrated amplifier includes a current-driven amp. The current-driven amp, also referred to as a current mode differential amplifier, has a very low input impedance. The input and feedback resistors set the amplifier gain and the input impedance. The band-pass response of the antenna circuit, and the amplifier's sensitivity to unwanted electric fields, are capable of being modified by adjusting the input impedance and/or feedback impedance of the current-driven operational amplifier. Input and feedback elements are appropriately selected to function with a switch to appropriately adjust the band-pass response and/or gain of the amplifier. In various embodiments, as discussed above with respect to FIG. 5 and the voltage-driven amp, the effective input impedance to the current-driven amp is adjustable using the impedance shunt.

The present subject matter is capable of being incorporated in a variety of near-field communication systems and technology that use such near-field communication systems such as hearing aids. For example, the present subject matter is capable of being used in hearing aids such as in-the-ear, half-shell and in-the-canal styles of hearing aids, as well as for behind-the-ear hearing aids. Furthermore, one of ordinary skill in the art will understand, upon reading and comprehending this disclosure, the method aspects of the present subject matter using the figures presented and discussed in detail above.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of legal equivalents to which such claims are entitled.

What is claimed is:

1. A communication circuit to receive and transmit signals, comprising:
    an antenna element having a first terminal and a second terminal;
    at least one electrostatic conductor positioned to shield the antenna element from electric fields, wherein the antenna element is adapted to induce a received signal at the first and second terminals when the antenna element is in a magnetic field;
    a driver connected to at least one of the first and second terminals to energize the antenna element with a transmitted signal;
    a differential amplifier having a first input connected to the first terminal of the antenna element and a second input connected to the second terminal of the antenna element, the differential amplifier having a selectable input impedance, wherein a lower first input impedance is used to amplify the received signal from the antenna element, and a higher second input impedance is used to monitor the transmitted signal from the driver; and
    a switch to toggle an effective input impedance between the second impedance and the first impedance.

2. The circuit of claim 1, wherein the second impedance includes a combination of the first impedance and a third impedance.

3. The circuit of claim 1, wherein the driver includes a differential driver having a first output stage connected to the first terminal of the antenna element and a second output stage connected to the second terminal of the antenna element.

4. The circuit of claim 3, further comprising a control line to ground one of the first and second output stages.

5. The circuit of claim 1, further comprising:
    a first resistor and a second resistor connected in series between the first antenna terminal and the first amplifier input; and
    a third resistor and a fourth resistor connected in series between the second antenna terminal and the second amplifier input;
    wherein the switch is adapted to shunt the second resistor and the fourth resistor such that the first impedance corresponds to the first resistor and the third resistor; and
    wherein the second impedance corresponds to a combination of the first and second resistors and a combination of the third and fourth resistors.

6. The circuit of claim 1, wherein the antenna element includes a first coil portion, a second coil portion, and a capacitor connected in series between the first coil portion and the second coil portion such that high-impedance nodes between the capacitor and the first and second coil portions are shielded by the electrostatic conductor to diminish interference and potentially damaging standing voltages.

7. The circuit of claim 1, wherein the antenna element includes at least one coil portion, the at least one electrostatic conductor positioned around the the at least one coil portion, and an insulator position between the at least one coil portion and the at least one electrostatic conductor.

8. The circuit of claim 7, wherein the electrostatic conductor equally distributes an electrostatic surface charge formed by electric fields across the antenna element to equally influence the first input and the second input of the differential amplifier.

9. The circuit of claim 7, wherein the electrostatic conductor is coupled to a reference potential to remove an electrostatic surface charge formed by electric fields.

10. A communication circuit to receive and transmit signals, comprising:
    an antenna element, including:
        a first and a second terminal;
        an inductive coil electrically connected to the first and the second terminals; and
        an electrostatic conductor to shield the inductive coil against electric fields;
    an amplifier circuit to amplify a magnetically-induced signal received by the antenna element, the amplifier circuit including:
        a differential amplifier, including a first input, a second input and an output;
        a first input impedance connected between the first input of the amplifier and the first terminal of the antenna element;
        a second input impedance connected between the second input of the amplifier and the second terminal of the antenna element;
        each of the first input impedance and the second input impedance including a first element and a second element;
        a predetermined feedback impedance connected between the output and at least one of the two inputs of the differential amplifier; and
        an input impedance shunt connected across the second element for each of the two inputs of the differential amplifier;
    a driver circuit to drive the antenna element with a transmission signal; and
    a control line connected to the input impedance shunt to selectively shunt the second element for each of the two inputs of the amplifier to selectively reduce an effective input impedance to the differential amplifier while receiving a signal from the antenna element.

11. The circuit of claim 10, wherein, for each of the first input impedance and the second input impedance, the first element and the second element are connected in series and are selected to:
    provide a desired first band-pass response for the antenna element and a desired first gain while monitoring the transmission signal from the driver circuit; and
    provide a desired second band-pass response for the antenna element and a desired second gain while receiving the magnetically-induced signal from the antenna element.

12. The circuit of claim 10, wherein the inductive coil includes a first portion and a second portion, and the antenna element includes a first capacitor connected in series between the first portion and second portion of the inductive coil, and the first capacitor is shielded by the electrostatic conductor.

13. The circuit of claim 10, wherein:

the inductive coil has a first coil portion and a second coil portion;

the first capacitor is connected between the first coil portion and the second coil portion; and the electrostatic conductor is positioned with respect to and insulated from the first capacitor and the first and second coil portions to shield the first capacitor and the first and second coil portions from electric fields and high standing voltages.

14. The circuit of claim 13, further comprising a tuning capacitor connected to the inductive coil, wherein the first capacitor allows the tuning capacitor to be large enough to significantly reduce effects of parasitic capacitance in tuning the antenna element.

15. The circuit of claim 10, wherein the amplifier circuit is configured as a low-noise, voltage-driven operational amplifier.

16. The circuit of claim 10, wherein the amplifier circuit is configured as a low-noise, current-driven operational amplifier.

17. The circuit of claim 10, wherein the electrostatic conductor is connected to a ground reference potential to conduct the electrostatic energy away from the antenna element.

18. The circuit of claim 10, wherein the electrostatic conductor is not connected to a reference potential, the electrostatic conductor functioning as an electrostatic energy equalizer to apply a voltage attributable to the electric fields to each of the two inputs of the differential amplifier to diminish the affects of the electrostatic energy.

19. The circuit of claim 10, further comprising a control circuit to detect a radio frequency (RF) signal input, and to provide a first control signal to the input impedance shunt and a second control signal to the driver circuit, wherein in response to detecting an RF signal input, the first control signal increases the effective input impedance to the differential amplifier and the second control signal enables the driver circuit to drive the antenna element with the transmission signal.

* * * * *

UNITED STATES PATENT AND TRADEMARK OFFICE
CERTIFICATE OF CORRECTION

PATENT NO. : 6,940,466 B2
DATED : September 6, 2005
INVENTOR(S) : Terry

It is certified that error appears in the above-identified patent and that said Letters Patent is hereby corrected as shown below:

Column 10,
Line 8, delete "the" before "at".
Line 9, delete "position" and insert -- positioned --, therefor.

Signed and Sealed this

Twenty-ninth Day of November, 2005

JON W. DUDAS
*Director of the United States Patent and Trademark Office*